May 2, 1933. J. J. MELLEY ET AL 1,907,081
RAILWAY JOURNAL BOX ASSEMBLY
Original Filed April 11, 1928
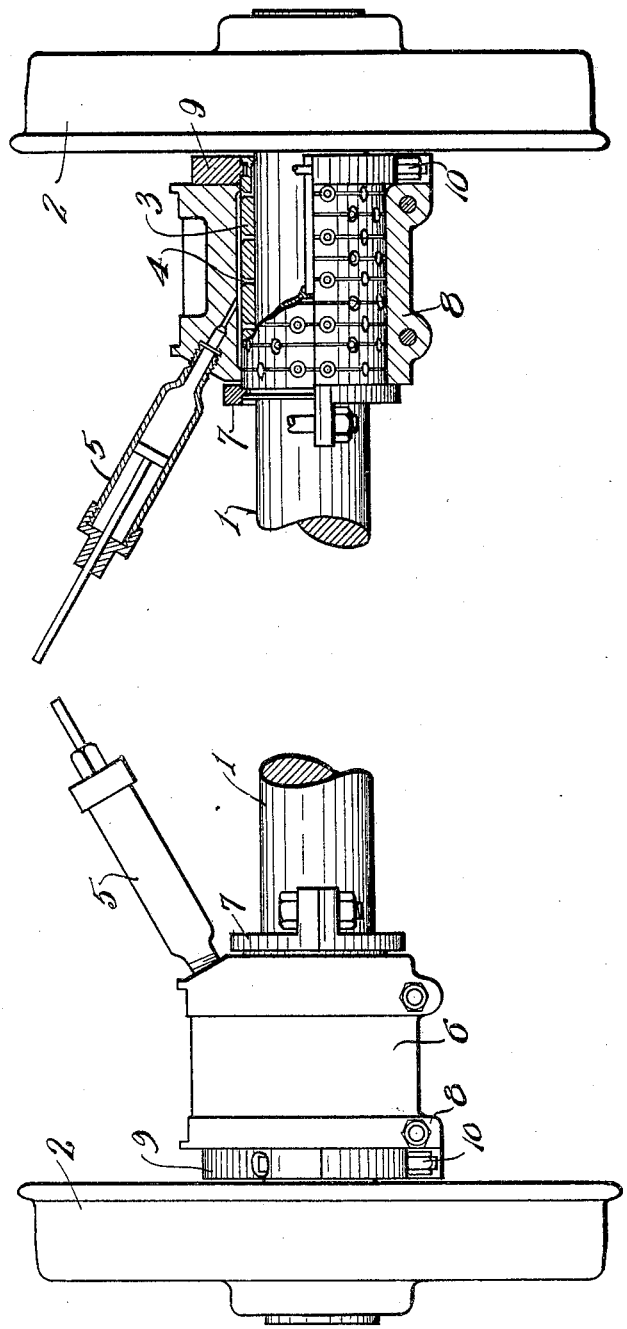
INVENTORS
John J. Melley and John W. Chapman
BY Thomas E. Scofield
ATTORNEY Patented May 2, 1933

1,907,081

UNITED STATES PATENT OFFICE

JOHN J. MELLEY, OF CHICAGO, ILLINOIS, AND JOHN W. CHAPMAN, OF PARSONS, KANSAS, ASSIGNORS OF ONE-THIRD TO W. H. HECKMAN, OF CHICAGO, ILLINOIS

RAILWAY JOURNAL BOX ASSEMBLY

Application filed April 11, 1928, Serial No. 269,271. Renewed September 9, 1932.

This invention relates to improvements in journal box assemblies, and refers more particularly to the use in connection with these assemblies, of a detachable hub liner positioned between the journal box and the car or engine wheel, the liners being affixed to the bearing brasses against lateral displacement.

The single figure in the drawing shows an axle wheel assembly with one of the bearings in elevation and the other partly in section and partly broken away, to disclose the internal construction of the journal assembly.

Referring to the drawing, at 1 is shown an axle on which is attached the wheel 2. Next to the axle and immediately adjacent the wheels are the bearing brasses 3 perforated as shown at 4 to receive lubricant supplied through the oiling devices 5. The bearing brasses are made in the form of bushings so that they are free to turn and are supported in the journal boxes 6 which are in turn supported in the box of the car or engine frame not shown.

It will be noted that the bearing brasses are of a novel construction, as they are of a split type, completely surrounding the axle and are free to turn. The inside ends of the bearing brasses are grooved to receive the circular ridge which is turned in the inside of the holding clamp 7. In our copending application, Serial No. 212,758, filed August 13, 1927, U. S. Patent 1,735,258, November 12, 1929 a similar construction is shown with the hub liner integral with the bearing brass. The present invention is an improvement upon this construction, as it permits the removal and replacement of the bearing and hub liner without raising the engine or car from the axle and removing the journal from the box of the frame by the use of a split hub liner 9 and a clamp 7. This hub liner 9 and the clamp 7 are secured to the bearing brass bushing 3 and turn with it. It has been found that the integral hub liner in my old type of construction will wear more rapidly than the bearing brasses. I contemplate the use of a separate hub liner so that in addition to ease of assembly and repair, a new hub liner may be replaced without the necessity of replacing the bearing brasses. Other objects of my invention will appear from the following description:

In the construction the assembly consists of removable blocks held together by bolted flanges. One of the blocks is shown at 8 in the drawing. After removing the split hub liner 9 and the clamp 7, the bearing can be split and can be replaced or repaired. Also, in case repairs are to be made on the hub liner or a new hub liner installed, the change can be made by removing the holding bolts 10 without disturbing in any way the bearing brackets.

The novelty and simplicity in the construction and the minimizing of labor in repair jobs are the important factors in establishing its advantages and utility.

We claim as our invention:

1. A railway journal box assembly of the character described, comprising a floating bushing surrounding the axle and supported in the journal box, a separate hub liner attached to the bushing between the wheel the journal box and rotating with the bushing.

2. A railway journal box assembly of the character described, comprising a journal box, a split removable bushing held in the journal box, a removable hub liner separate from the brass fixed against lateral displacement upon the bearing brass.

3. A railway journal box assembly of the character described comprising a floating bushing surrounding the axle and supported in the journal box, and a separate split hub liner rotatable with the bushing between the wheel and the journal.

4. A railway journal box assembly of the character described comprising a floating bushing surrounding the axle and supported in the journal box, a separate hub liner detachably fastened to the floating bushing and rotatable therewith.

5. A railway journal box assembly of the character described comprising a floating bushing surrounding the axle and supported in the journal box, and a separate split hub liner detachably fastened to the floating bushing and rotatable therewith.

JOHN J. MELLEY.
JOHN W. CHAPMAN.